United States Patent Office 3,342,859
Patented Sept. 19, 1967

3,342,859
TETRAHALOHYDROXYBENZAMIDES
Edwin Dorfman, Grand Island, and Edward D. Weil, Lewiston, N.Y., assignors to Hooker Chemical Corporation, Niagara Falls, N.Y., a corporation of New York
No Drawing. Filed Nov. 30, 1962, Ser. No. 241,128
6 Claims. (Cl. 260—559)

This invention relates to new compositions of matter and to new processes for producing them. More specifically, the instant invention is concerned with amides of perhalogenated hydroxybenzoic acids and novel processes for production thereof.

The products of the invention have utility as pesticides, exhibiting a high order of anti-microbial activity as well as nematocidal and herbicidal properties.

The novel compositions of the instant invention are represented by the following formula:

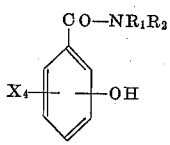

wherein X is selected from the group consisting of chlorine and bromine (preferably chlorine) and $R_1$ and $R_2$ are substituents selected from the group consisting of hydrogen, alkyl (from 1 to about 20 carbon atoms), phenyl, benzyl, halophenyl (preferably chlorophenyl), alkylphenyl, and nitrophenyl. When $R_1$ and $R_2$ are alkyl, they may optionally be conjoined directly by a carbon-to-carbon bond or through a hetero-atom such as oxygen, sulfur or nitrogen to form a ring chain. The OH may be ortho-, meta-, or para- to the $CONR_1R_2$ group, and the products may be isomer mixtures.

Compositions included within the scope of the invention are, e.g.,

N-methyl-,
N-ethyl-,
N-propyl-,
N-butyl-,
N-amyl-,
N-octyl-,
N-decyl-,
N-dodecyl-,
N-stearyl-,
N,N-dimethyl-,
N,N-diethyl-,
N,N-dipropyl-,
N,N-diisopropyl-,
N,N-dibutyl-,
N,N-diamyl-,
N,N-dioctyl-,
N,N-didecyl-,
N,N-di-dodecyl-,
N-methyl-N-butyl-,
N-methyl-N-lauryl-,
N,N-diallyl-,
N-benzyl-,
N-phenyl-,
N-o-chlorophenyl-,
N-m-chlorophenyl-,
N-p-chlorophenyl-,
N-p-bromophenyl-,
N-2,5-dichlorophenyl-,
N-3,4-dichlorophenyl-,
N-3,4-dibromophenyl-,
N-3,4,5-trichlorophenyl-,
N-o-tolyl-,
N-m-tolyl-,
N-p-tolyl-,
N-3,4-xylyl-,
N-3-chloro-4-methylphenyl-,
N-3-methyl-4-chlorophenyl-,
N-p-tertiarybutylphenyl-,
N-o-nitrophenyl-,
N-m-nitrophenyl-,
N-p-nitrophenyl-, and
N-2,4-dinitrophenyl-tetrachlorohydroxybenzamide,
tetrachlorohydroxybenzopyrrolidide,
tetrachlorohydroxybenzomorpholide and
tetrachlorohydroxybenzopiperidide, to name a few examples. The corresponding bromine derivatives may also be employed, as may mixed halogenated compounds, provided all such compounds have four halogens on a benzene nucleus.

Preferred embodiments, because of high bacteriostatic activity and relatively low costs, are the N-phenyl-, N-(chlorine-substituted)phenyl-, N-(nitro-substituted)phenyl-, and N-(lower alkyl-substituted)phenyl tetrachlorohydroxybenzamides or utilizing alternative nomenclature, the tetrachlorohydroxybenzanilides having either no substituent or having chlorine, nitro or lower alkyl substituents on the aniline moiety. Within this preferred embodiment, the 4'-chloro and 3',4'-dichloro-substituted tetrachlorohydroxybenzanilides were found to be especially outstanding bacteriostats.

Although many lower halogenated hydroxybenzoic acid derivatives are known, it has not hitherto been possible to prepare tetrachlorohydroxybenzamides having four chlorine atoms on the hydroxy-substituted benzene ring from pentachlorobenzamides. For example, the attempted chlorination of salicylamides gives substitution on the side chain in preference to perchlorination of the salicylic ring.

A surprising and unexpected route to tetrachlorohydroxybenzamides has now been discovered. When pentachlorobenzamides are treated with a strong base in the presence of certain specific organic co-solvents, especially ethylene glycol or methanol, the expected saponification of the amide linkage does not occur, but rather a chlorine atom is displaced from the pentachloro-benzoyl moiety giving a tetrachlorohydroxybenzoyl moiety. The product is a mixture of all three isomers (o, m, and p-hydroxybenzamide isomers) as can be shown by the presence of three amide carbonyl bands in the infrared spectrum, by three inflections in a potentiometric acid-base titration curve, and by resolution into the components by crystallization.

That the amide linkage does not cleave is surprising in view of the vast number of examples of splitting of the —CO—NR— group by strong bases.

The invention in its process aspects comprises in part heating a pentachlorobenzamide of the structure:

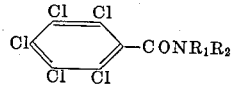

where $R_1$ and $R_2$ correspond to the groups defined in the product structure given above, with at least two molar equivalents of a strong base dissolved in a solvent quantity of ethylene glycol or methanol until a substantial fraction of one molar equivalent of chloride ion has been released. The strong base should be capable of forming the alcoholate of the ethylene glycol or methanol. Suitable bases are, for example, sodium hydroxide, potassium hydroxide, lithium hydroxide, and sodium hydride. Also, the preformed alcoholate, such as $NaOCH_3$ or $NaOCH_2CH_2OH$, may be employed, or an alkali metal may be added to the solvent to form the alcoholate. Reaction temperatures of from 120 degrees centigrade to 200 degrees centigrade are preferred, and reaction times of from one-half hour (at the higher temperatures) to several days (at the lower temperatures) are used. Atmospheric pressure may be used where ethylene glycol is the chosen solvent, whereas an autoclave should be used with methanol because of its superatmospheric pressure at the reaction temperature.

The initial product is the alkali metal salt of the hydroxybenzamide. While for many purposes said salts are useful per se, it is found efficacious to purify the product by converting it to the free acid (phenolic) form of the hydroxybenzamide by acidification of the reaction mixture by adding any acid having a $pK_A$ less than that of the product. Suitable acids are, e.g., mineral acids, such as hydrochloric or sulfuric acid. To cause the acid to precipitate from solution on acidification it is convenient to dilute the reaction mixture with water. The precipitated product may then be isolated by filtration, centrifugation, or extraction with a solvent. Analogous processes start with pentabromobenzamides.

The following examples serve to illustrate the invention but they are not intended to limit it thereto.

Example 1.—Preparation of N-p-chlorophenyltetrachlorohydroxybenzamide 0.111 gram mole of 2,3,4,4′,5,6-hexachlorobenzanilide, 0.223 gram mole of NaOH and 320 grams of ethylene glycol were heated at 140 degrees for 43 hours. The reaction was nearly complete as determined by Volhard chloride analysis. The reaction mixture was poured into water and filtered, removing a small amount of insoluble material. The filtrate was acidified. The precipitate was filtered out, washed and dried. The product was extracted with hot hexane to remove soluble impurities and was dried to yield 10 grams of colorless solid product, having a neutralization equivalent of 385 (theory 385.5).

Analysis.—Calcd. for $C_{13}H_6O_2NCl_5$: N, 3.64 percent. Found: N, 3.54 percent.

Example 2.—Preparation of N-methyl tetrachlorohydroxybenzamide 0.11 gram mole of N-methyl-2,3,4,5,6-pentachlorobenzamide, 0.223 gram mole of NaOH and approximately 300 grams of ethylene glycol were heated at about 140 degrees centigrade until Volhard titration of a small aliquot showed that substantially the theoretical amount of chloride ion had been released. The mixture was poured into water and filtered, removing a small amount of insoluble material. The filtrate was acidified and the precipitate was filtered, washed and dried. The product was extracted with hot benzene and was dried to obtain a colorless solid having a neutralization equivalent of 292 (theory 289).

Example 3.—Preparation of N,N-dimethyltetrachlorohydroxybenzamide 0.1 gram mole of N,N-dimethyl-2,3,4,5,6-pentachlorobenzamide, 0.23 gram mole of NaOH and approximately 300 grams of ethylene glycol were heated at about 140 degrees centigrade until the evolution of chloride was practically the theoretical. The reaction mixture was poured into water and filtered, removing a small amount of insoluble material. The filtrate was acidified and the precipitate was filtered out, washed with water, and dried. The product was extracted with hot hexane to remove soluble impurities and was dried to obtain a colorless solid having a neutralization equivalent of 298 (theory 303).

Analysis.—Calcd. for $C_9H_7O_2NCl_4$: N, 4.84 percent, Cl, 49.2 percent. Found: N, 4.98 percent; Cl, 49.1 percent.

Example 4.—Preparation of N-2,4,5,7-tetramethyloctyltetrachlorohydroxybenzamide 0.1 gram mole of N-2,4,5,7-tetramethyloctyl-2,3,4,5,6-pentachlorobenzamide, 0.2 gram mole of NaOH and approximately 300 grams of ethylene glycol were heated at about 140 degrees centigrade until Volhard titration indicated 0.1 mole of chloride to be present. The reaction mixture was poured into water and filtered, removing a small amount of insoluble material. The filtrate was acidified, filtered, washed and dried, to obtain a waxy semi-solid product having a neutralization equivalent of 451 (theory 443).

Analysis.—Calcd. for $C_{19}H_{27}O_2NCl_4$: N, 3.16 percent; Cl, 32.0 percent. Found: N, 3.00 percent; Cl, 31.5 percent.

Example 5.—Preparation of N-dodecyl-N-methyltetrachlorohydroxybenzamide 1 gram mole of N-dodecyl-N-methyl-2,3,4,5,6-pentachlorobenzamide, 2 gram moles of NaOH and approximately 3 liters of ethylene glycol were heated at about 140 degrees centigrade until titration of chloride ion indicated substantial completion of reaction. The reaction mixture was poured into water and was filtered, removing a small amount of insoluble material. The filtrate was acidified, filtered, washed and dried. The product was a waxy substance having a neutralization equivalent of 461 (theory 457).

Analysis.—Calcd. for $C_{20}H_{29}O_2NCl_4$: N, 3.06 percent; Cl, 31.0 percent. Found: N, 3.01 percent; Cl, 30.4 percent.

Example 6.—Preparation of tetrachlorohydroxybenzanilide 0.1 gram mode of 2,3,4,5,6-pentachlorobenzanilide, 0.22 gram mole of NaOH and approximately 300 grams of ethylene glycol were heated at 125 to 145 degrees centigrade until about 0.1 mole of chloride ion was released. The reaction mixture was poured into water and filtered, removing a small amount of insoluble material. The filtrate was acidified, filtered, washed and dried, then recrystallized from hot benzene to obtain a colorless solid, M.P. 208 to 208.5 degrees, having a neutralization equivalent of 347 (theory 351).

Analysis.—Calcd. for $C_{13}H_7O_2NCl_4$: N, 3.99 percent; Cl, 40.4 percent. Found: N, 3.92 percent; Cl, 39.9 percent.

Example 7.—Preparation of N-3,4-dichlorophenyltetrachlorohydroxybenzamide 0.11 gram mole of 2,3,4,4′,5,5′,6-heptachlorobenzanilide, 0.22 gram mole of NaOH and approximately 300 grams of ethylene glycol were heated at about 140 degrees centigrade for two days. The reaction mixture was poured into water and was filtered, removing a small amount of insoluble material. The filtrate was acidified, filtered, washed and dried. The product was extracted with hot hexane to remove soluble impurities and was dried, to obtain a colorless solid, having a neutralization equivalent of 418 (theory 420).

Analysis.—Calcd. for $C_{13}H_5O_2NCl_4$: N, 3.31 percent. Found: N, 3.33 percent.

Example 8.—Preparation of N,N-diethyltetrachlorohydroxybenzamide 0.1 gram mole of N,N-diethyl-2,3,4,5,6-pentachlorobenzamide, 0.22 gram mole of NaOH and approximately 300 grams of ethylene glycol were heated at about 140 degrees centigrade for two days. The reaction mixture was poured into water and filtered. The filtrate was acidified, refiltered, washed with water and dried, to obtain a colorless solid, having a neutralization equivalent of 339 (theory 331).

Example 9.—Preparation of N,N-diisopropyltetrachlorohydroxybenzamide 0.1 gram mole of N,N-diisopropyl-2,3,4,5,6-pentachlorobenzamide, 0.22 gram mole of NaOH and approximately 300 grams of ethylene glycol were heated at about 140 degrees centigrade for two days. The reaction mixture was poured into water and filtered. The filtrate was acidified, refiltered, washed with water and dried, to obtain a colorless solid, having a neutralization equivalent of 358 (theory 359).

*Example 10.—Preparation of N,N-dibutyltetrachlorohydroxybenzamide*

0.1 gram mole of N,N-dibutyl-2,3,4,5,6-pentachlorobenzamide, 0.22 gram mole of NaOH and approximately 320 grams of methanol were heated in an autoclave at 140 degrees centigrade for forty-three hours. The reaction mixture was poured into water and filtered, removing a small amount of insoluble material. The filtrate was acidified, filtered, washed with hot water and dried, to obtain a colorless solid, having a neutralization equivalent of 330 (theory 331).

*Example 11.—Herbicidal use*

Greenhouse flats were seeded with ragweed, crabgrass, lambsquarters, pigweed, and soybeans and were then sprayed with aqueous dispersions of various of the chemicals of the invention at a rate equivalent to 12 pounds per acre. Two weeks later, weed control and the condition of the beans were estimated, with the following results:

| Chemical | Weed Control* | Condition of Soybeans |
|---|---|---|
| N-methyltetrachlorohydroxybenzamide | 80 | No damage. |
| N,N-dimethyltetrachlorohydroxybenzamide | 100 | Do. |
| N,N-diethyltetrachlorohydroxybenzamide | 70 | Do. |
| N,N-diisopropyltetrachlorohydroxybenzamide | 80 | Do. |

* Percent suppression relative to unsprayed flats.

*Example 12.—Fungicidal use*

Tomato plants inoculated with spores of *Alternaria solani*, the causative fungus of early blight disease, were sprayed with 0.04 percent dispersions of several of the chemicals of the invention. Substantially 100 percent prevention of the disease symptoms (lesions) was noted when the plants were inspected two weeks later, in the case of those plants treated with the anilide and the p-chloroanilide of tetrachlorosalicylic acid. Substantial (about 50 percent) repression of leaf lesions was noted with 3,4-dichloroanilide of tetrachlorohydroxybenzoic acid.

*Example 13.—Bacteriostatic use*

Various of the chemicals of the invention were incorporated into nutrient broth inoculated with cultures of *Staphylococcus aureus* and *Escherichia coli*. The growth or lack of growth of the bacterial colonies was noted after a two-day incubation period.

| | Minimum Concentration Giving Bacteriostasis (percent) | |
|---|---|---|
| | S. aureus | E. coli |
| 3,4,5,6-tetrachlorohydroxybenzoic acid | 0.020 | 0.0200 |
| Tetrachlorohydroxybenzanilide | 0.0019 | 0.0038 |
| N-p-chlorophenyltetrachlorohydroxybenzamide | 0.0010 | 0.0038 |
| N-3,4-dichlorophenyltetrachlorohydroxybenzamide | 0.0010 | 0.0038 |

*Example 14.—Nematocidal use*

N,N-dibutyltetrachlorobenzamide was incorporated into soil infested with *Meloidogyne incognita*, a nematode causative of root knot disease of various crop plants, at the rate of 0.125 gram of chemical per quart of soil. Tomato seedlings were planted therein, and their roots were examined two weeks later. Substantially complete prevention of root knotting was observed. Similar seedlings planted in the same infested soil without the chemical were heavily damaged by root galls and lesions.

The composition of the instant invention may be used in the form of a dust, or a spray and may be used in admixture with a substance, for example, a diluent or a solvent, a wetting, emulsifying, or adhering agent.

Various changes and modifications may be made in the methods and compositions of this invention, certain preferred forms of which have been herein described, without departing from the spirit and scope of this invention.

We claim:

1. A product of the process of heating a composition of the formula

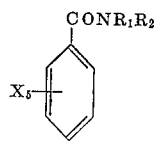

wherein X is selected from the group consisting of chlorine and bromine, the substituents $R_1$ and $R_2$ are substituents selected from the group consisting of hydrogen, alkyl of from 1 to 20 carbon atoms, phenyl, benzyl, halopenyl, lower alkyl phenyl and nitrophenyl, in the presence of a strong base and a solvent chosen from ethylene glycol and methanol until substantially one molar equivalent of halide is liberated.

2. A process for the preparation of compositions of the formula:

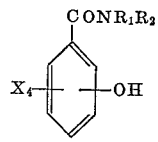

comprising heating the composition of the formula:

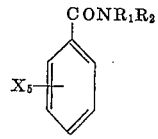

wherein X is selected from the group consisting of chlorine and bromine, the substituents $R_1$ and $R_2$ are substituents selected from the group consisting of hydrogen, alkyl of from 1 to 20 carbon atoms, phenyl, benzyl, halophenyl, lower alkylphenyl and nitrophenyl, in the presence of a strong base and a solvent chosen from ethylene glycol and methanol until substantially one molar equivalent of halide is liberated.

3. The process of claim 2 wherein the temperature is in the range from between about 120 to about 200 degrees centigrade.

4. The process of claim 2 wherein the strong base is sodium hydroxide.

5. The process of claim 2 wherein the solvent is ethylene glycol.

6. A process for the preparation of tetrachlorohydroxybenzanilide which comprises reacting 2,3,4,5,6-pentachlorobenzanilide with sodium hydroxide and ethylene glycol at a temperature of from about 125 degrees centigrade to 150 degrees centigrade until about 1 molar equivalent of chloride ion is released followed by acidification.

References Cited

UNITED STATES PATENTS

| 2,410,397 | 10/1946 | Weiss et al. | 260—559 |
| 2,463,462 | 3/1949 | Huck | 260—559 |
| 2,723,192 | 11/1955 | Todd | 71—2.6 |
| 2,726,150 | 12/1955 | Wolter | 71—2.6 |
| 2,998,348 | 8/1961 | Seydel et al. | 167—31 |

(References on following page)

| | | |
|---|---|---|
| 3,012,934 | 12/1961 | Cantrel et al. ........ 167—31 |
| 3,014,965 | 12/1961 | Newcomer et al. ___ 260—558 X |

FOREIGN PATENTS

| | | |
|---|---|---|
| 1,071,910 | 3/1954 | France. |
| 1,240,597 | 8/1960 | France. |

OTHER REFERENCES

Biltz et al., Chem. Ber. vol. 34 pgs. 4118–4128 (pages 4126–41–47 relied upon), 1901.

Faust et al., "Amer. Pharmaceutical Assoc. Journal, vol. 45, pages 514–517 (56) (note page 516).

Horsfall Fungicides and their Action page 151 Chronica Bolone (1945).

Lemaire et al., J. of Pharmaceutical Sciences, vol. 50, pgs. 831–837 (61) (note pages 831, 833, and 836).

Noller, "Chemistry of Organic Compounds" (Textbook) 2nd Edition, pages 435-6 and 462-3 (1957).

Royals Advanced Org. Chemistry, Prentice Hall 1954, page 445.

Pfanz et al., Arch. der. Pharm., volume 289, pages 651–663 (1956).

WALTER A. MODANCE, *Primary Examiner.*

NICHOLAS S. RIZZO, *Examiner.*

R. L. PRICE, A. D. SPEVACK, *Assistant Examiners.*